US006003737A

United States Patent [19]

[11] Patent Number: 6,003,737

[45] Date of Patent: Dec. 21, 1999

Mascitelli

[54] ENHANCED MICROPUMP FOR THE NEBULIZATION OF FLUIDS

[75] Inventor: Francesco Mascitelli, Pescara, Italy

[73] Assignee: Sar S.p.A., San Giovanni Teatino, Italy

[21] Appl. No.: 09/048,982

[22] Filed: Mar. 27, 1998

[51] Int. Cl.[6] .......... G01F 11/36

[52] U.S. Cl. .......... 222/321.2; 222/321.7; 222/373; 222/380

[58] Field of Search .......... 222/321.2, 321.7, 222/321.9, 336, 373, 380

[56] References Cited

U.S. PATENT DOCUMENTS 3,877,616 4/1975 Stevens .
4,215,804 8/1980 Guiffredi .......... 222/321.2

FOREIGN PATENT DOCUMENTS 0370257 5/1990 European Pat. Off. .
0686434 12/1995 European Pat. Off. .
2366068 4/1978 France .
9427732 12/1994 WIPO .

*Primary Examiner*—Andres Kashnikow
*Assistant Examiner*—David Deal
*Attorney, Agent, or Firm*—Browdy and Neimark

[57] ABSTRACT

The present invention relates to an enhanced micropump for the nebulization of fluids. The micropump, mounted on a bottle cap, comprises a hollow body and a set of stem and piston such as to constitute a "metering chamber" in the body. The set, protruding outside the body, is joined with a dispensing push-button fitted with a nebulization element. Pressing the dispensing push-button allows the passage of the fluid to be nebulizer from the "metering chamber" to an exit duct for the fluid itself, comprising a "compression pre-chamber" in the dispensing button and passages from the chamber to the nebulization element. A metering valve is obtained by interposing, in said fluid exit duct, an elastically deformable shutter positioned in a cylindrical seat in the top end of the set.

2 Claims, 1 Drawing Sheet

ENHANCED MICROPUMP FOR THE NEBULIZATION OF FLUIDS

BACKGROUND OF THE INVENTION

The present invention relates to an enhanced micropump for the nebulization of fluids.

A micropump of this kind is suitable for mounting on a cap for glass or plastic bottles destined to contain perfumes or other substances which, in relation to their specific use, require nebulization.

Generally, this type of micropump comprises a pump body and a set of hollow stern and piston such as to constitute together with the body a "metering chamber";0 the exit duct for the fluid includes the longitudinal cavity of the hollow stem, a so called "compression pre-chamber" obtained in a dispensing push-button and at least one passage from this "compression pre-chamber" to a "vortex chamber" of a nebulization element fitted with related orifice. The stem and piston set is movable within the body thanks to the antagonistic action between the dispensing push-button and a helical spring, abutting in the "metering chamber" against the front end of the stem. The stem and the piston of the set are, themselves, mutually movable to uncover one or more through holes obtained in the stem, at the moment the dispensing push-button is pressed to allow the fluid to be nebulized to pass from the "metering chamber" into the fluid exit duct.

In a system of this type the pressure inside the "metering chamber" necessary to obtain a correct nebulization is guaranteed by a valve, which could be called "minimum pressure" valve, obtained with the aforesaid piston and a "pre-loading" spring abutted between the piston and a flange provided on the stem inside the pump body. Such "minimum pressure" valve determines the threshold pressure which must exist in the "metering chamber" for the through holes of the stem to be uncovered, and the pressurized fluid to travel through the longitudinal cavity of the stem, reach the "compression pre-chamber", be accelerated and exit from the orifice of the nebulization element, creating the nebulization cone.

In the prior art system the correct nebulization requires the fluid to reach the "compression pre-chamber" with sufficient pressure to be accelerated adequately. This depends mainly: 1) on the pre-load imparted by the "pre-loading" spring in relation to the surface area of the inner straight section of the pump body, 2) on the head losses the fluid undergoes in its exit duct, and 3) on the "sensitivity" of the "minimum pressure" valve. On the basis of the first factor mentioned, it is evident that, the spring pre-load value being equal, the smaller the inner diameter of the pump body, the greater the pressure threshold value will be and the better the nebulization will be. On the other hand it is not advantageous to increase the spring pre-load excessively since, for the same inner diameter of the body, the force that the user must impart to the dispensing push-button would be excessive and the use of the device would not be very comfortable.

For the second factor, the smaller the head losses, with the threshold pressure being equal, the more pressure the fluid retains in correspondence with the "compression pre-chamber".

Lastly, the "sensitivity" of the "minimum pressure" valve is its ability to shut the passage when the pressure in the "metering chamber" drops below the threshold value. This generally occurs when the speed with which the dispensing push-button, and thus the stem and piston set, is lowered, is slow. If the "minimum pressure" valve is not very sensitive, the fluid reaches the nebulization clement with insufficient pressure for adequate nebulization.

On the basis of the first factor mentioned above, the prior art pump presents, due to a distinct construction of stem and piston, the drawback of having a pump body with an excessive cross section, and therefore insufficient threshold pressure values are determined with the need to increase spring pre-load.

With regard to the second factor in relation to the prior art pump, since the "minimum pressure" valve, comprised by the piston which covers and, vice versa, uncovers the holes by means of the "pre-loading" spring, is situated away from the "compression pre-chamber", the head losses, i.e. Those along the hollow stem, are significant, and hence pressure in the "compression pre-chamber" can be insufficient.

With reference to the sensitivity of the prior art pump, the friction forces generated between the outer lip of the piston and the inner surface of the pump body tend to hamper the correct closure of the piston pushed by the pre-loading spring, even when pressure in the duct would actually be lower than its threshold value.

Pump systems already exist which use micro-springs associated to micro-shutters positioned inside the cylindrical duct of the stem in the vicinity of the nebulization element, which acting on small sections, maximize, other conditions being equal, the dispensing pressure value. These systems, being independent of friction resistance, also present high "sensitivity".

Although they are able to obviate all drawbacks, the aforementioned systems are particularly complex and, given their small size, the production of their components and their assembly, especially in terms of dimensional precision and repeatability, are very onerous, and thus entail an increase of the final cost of the pumps and of the containers whereto they are applied.

SUMMARY OF THE INVENTION

The object of the present invention therefore is to eliminate the drawbacks mentioned above.

The invention, as it is characterized in the claims that follow, solves the problem of providing an enhanced micropump for the nebulization of fluids of the type applied on a bottle, comprising a hollow body, having a bottom opening which receives from below a suction tube and fitted a with a check ball valve, and a top end opening closed by a cap; a stem and piston set such as to constitute a "metering chamber" in the part of said body comprising said ball valve, the stem and piston set protruding outside said body through said cap and being joined at the top with a dispensing push-button to be compressed manually, provided with "compression pre-chamber" and with a nebulization element equipped with related orifice; said stem and piston set being movable within said body thanks to the antagonistic action between said dispensing push-button and a helical spring, abutted in said "metering chamber" against said stem; micropump which from a general point of view, is characterized in that said body presents a bottom part comprising a central portion terminating in said lower opening, shaped as a tube oriented coaxially toward said top end opening; said stem and piston set is obtained in a single piece with a first portion converging upward, a step projection protruding inward, a second portion converging upward, a tubular element terminating, in the top end, in a coaxial cylindrical seat, delimited at the top by said dispensing push-button, said stem and piston set, mounted on said bottom part of said hollow body with the interposition of an antagonist spring, realizes a metering valve by means of a shutter elastically deformable in a pre-set measure positioned in said cylindrical seat, following an increase in fluid pressure in the space delimited by said stem and piston set and said hollow body, in order to allow the metered passage of fluid through to said nebulization element orifice.

According to the present invention the aforesaid antagonist function, performed by the spring in the conventional “minimum pressure” pump, is assumed by the elastically deformable shutter positioned in the duct for the passage of the fluid. The counter-pressure, which is created in the duct due to the presence of the shutter, grows until it equals a minimum or threshold pressure pre-set for the metering chamber, sufficient to create an adequate nebulization. Such pressure is also sufficient to deform the shutter elastically, allowing the pressurized fluid to flow beyond the temporarily deformed shutter until it reaches the orifice of the nebulization element.

The advantage thereby obtained is that the presence of the “pre-loading” spring is no longer necessary, and the spring is thus replaced by a component such as an elastomeric dowel, which is less expensive as well as easier to dispose of and recycle.

An additional, not secondary, functional advantage is that with the shutter according to the present invention, the communication of the inside of the bottle or other container with the outside air is interrupted. This can have a certain importance in preventing the volatilization of perfumes or the like, but especially the spoiling of other substances perishable in air, which are dispensed by means of the type of micropump in question.

Moreover, the conformation of the pump body and of the stem and piston set allows a plurality of additional advantages as listed below. The overall number of pieces comprising the micropump is reduced with respect to prior art systems.

The inner passage sections for the pressurized fluid are wider with respect to those of the prior art, so head losses are smaller.

Moreover, gasket seals are eliminated.

In general, the micropump according to the invention is more compact and of smaller size, with the aesthetic advantages deriving thereby. Its assembly is much easier and more rapid and, overall, its manufacturing costs arc lower.

BRIEF DESCRIPTION OF THE DRAWINGS

Additional characteristics and advantages of the present invention shall be made clearer by the detailed description that follows, of a preferred embodiment shown purely by way of non-limiting indication in the accompanying drawings, in which.

DESCRIPTION OF THE PREFERRED EMBODIMENT

Figure 1:
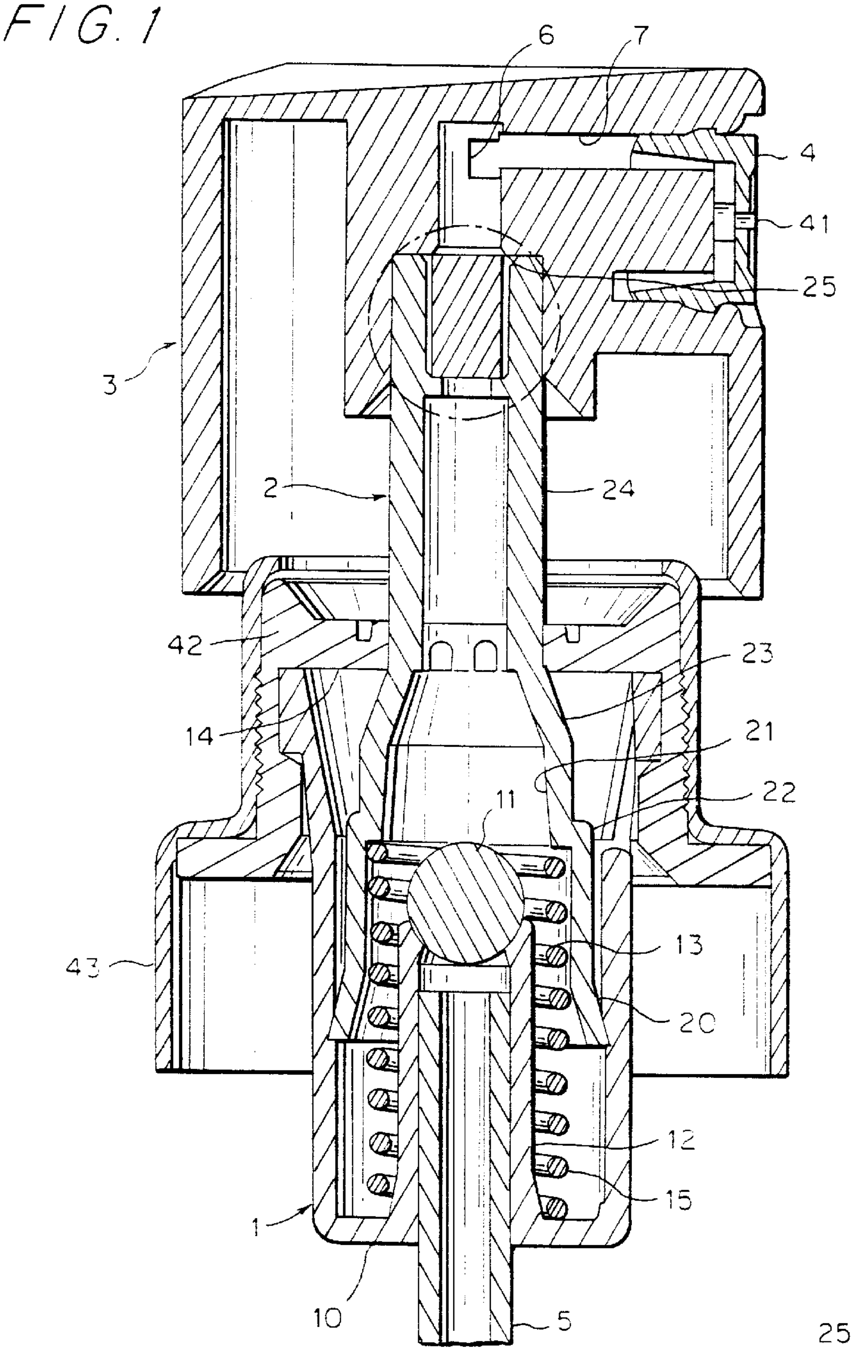
FIG. 1 shows a longitudinal section of a first embodiment of a micropump according to the present invention in resting condition.

According to the present invention, in FIG. 1 the number 1 indicates a hollow pump body, 2 a stem and piston set, 3 a dispensing push-button, 4 a nebulization element, and 5 a suction tube.

The micropump for the nebulization of fluids according to the invention is mounted, as shown, on a flanged cap 42, destined to be applied, by means of a disc 43 drawn into a clamp (bottom) on the neck of a bottle not shown.

The hollow body 1 presents a bottom part 10 comprising a central portion 12 shaped as a tube oriented coaxially toward a top opening 14 of the body 1 and ending with a bottom opening 13.

In the central portion 12 is inserted the suction tube 5, destined to be immersed in the fluid to be nebulized. The hollow body 1 is fitted at its bottom with a ball check valve 11 and it is closed at the top, for instance, as mentioned above, with the flanged cap 42.

The stem and piston set 2 within the hollow body comprises a “metering chamber” 21 in the lower part of the hollow body 1, i.e. the one where the ball valve 11 is. According to the present invention, the stem and piston set 2 is constructed in a single piece with a first bell shaped portion 20 converging upward, a step projection 22 protruding inward, a second portion 23 converging upward, a tubular element 24 ending, in the top end, in a coaxial cylindrical seat 25, delimited at its top by the dispensing push-button 3.

The stem and piston set 2 is mounted on the bottom part 10 of the hollow body with the interposition of an antagonist spring 15, abutted at the top in the step projection 22 of the set 2. The stem and piston set 2 realizes, with the hollow body 1 a metering valve by means of shutter 8 elastically deformable in a pre-set measure positioned in the cylindrical seat 25 of the set 2. The dowel 8, which may have any other appropriate shape, is thus interposed in the exit duct for the fluids to be nebulizer coming from the suction tube 5, even in a position other than the one provided for above. From the “metering chamber” 21, the exit duct develops in the tubular element 24, in the seat 25 for the shutter, in a so-called “compression pre-chamber” 6 and in passages 7 of the dispensing push-button 3 through to the exit orifice 41 of the nebulization element 4.

The operation of the micropump according to the invention is provided hereafter.

Figure 2:
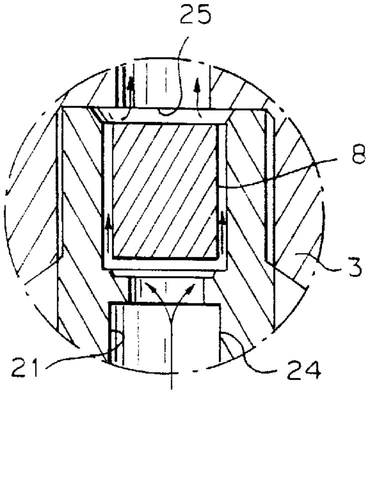
FIG. 2 shows in enlarged scale a detail circled in FIG. 1.

When the user presses the dispensing push-button passing from the resting condition shown in FIG. 1 to the dispensing condition shown in FIG. 2, the stem and piston set 2 under the manual actuation moves downward. The pressurized fluid, from the “metering chamber” 21 reaches the seat 25 of the dowel 8. The dowel 8 is transformed from its non-deformed condition of FIG. 1, when the pressure within the “metering chamber” 21 is lower than the minimum or threshold pressure for nebulization, to the elastically deformed condition of FIG. 2. In this second condition, the fluid passes beyond the seat 25 of the dowel 8, lapping it (as shown schematically by the flow lines in FIG. 2), reaches the “compression pre-chamber” 6, and hence the passages 7 through to the exit orifice 41. Upon the exit of the fluids, the pressure in the “metering chamber” 21 drops below the minimum or threshold value regulated by the rigidity of the dowel 8, which closes the fluid exit duct. The user then releases the dispensing push-button 3 which, moving back upward, increases the vacuum in the “metering chamber” 21. The ball valve 11 opens the passage from the suction tube 43 and new fluid passes from the bottle to the “metering chamber” 21 of the micropump for subsequent nebulization upon repeated pressing of the dispensing push-button 3.

The invention thus conceived can be subject to numerous modifications and variations, without thereby departing from the scope of the inventive concept. Moreover, all components may be replaced with technically equivalent elements.

In practice, modifications and/or improvements are obviously possible without thereby departing from the scope of the following claims.

What is claimed:

1. Enhanced micropump for the nebulization of fluids of the kind applied onto a bottle, comprising:

a hollow body, having a bottom opening receiving from below a suction tube and fitted with a ball check valve, and a top end opening closed by a cap;

a stem and piston set such as to constitute a "metering chamber" in the part of said body comprising said ball valve the stem and piston set protruding outside said body through said cap and being joined at the top to a dispensing push-button to be compressed manually provided with a compression pre-chamber and with a nebulization element fitted with related orifice;

said stem and piston set being movable within said body thanks to the antagonistic action between said dispensing push-button and a helical spring, abutted in said "metering chamber" against the front end of said stem and piston set;

wherein said body presents a bottom part comprising a central portion ending in said bottom opening of the body and shaped as a tube oriented coaxially toward said top end opening;

said stem and piston set is constructed in a single piece with a first portion converging upward, a step projection protruding inward, a second portion converging upward, a tubular element terminating, in the top end, in a coaxial cylindrical seat, delimited at the top by said dispensing push-button;

said stem and piston set, mounted on said bottom part of said hollow body with the interposition of the antagonist spring, realizes a metering valve by means of a shutter elastically deformable in a pre-set measure positioned in said cylindrical seat, as a result of an increase in fluid pressure in the space delimited by said stem and piston complex and by said hollow body, in order to allow the metered passage of fluid through to said nebulization element orifice.

2. Micropump according to claim 1, wherein said shutter is a cylindrical dowel made of elastomeric material.

* * * * *